United States Patent [19]

Gilkey et al.

[11] 4,254,254

[45] Mar. 3, 1981

[54] POLYESTER AMIDE FABRIC ADHESIVES

[75] Inventors: Russell Gilkey; Thomas H. Wicker, Jr., both of Kingsport, Tenn.

[73] Assignee: Eastman Kodak Company, Rochester, N.Y.

[21] Appl. No.: 113,987

[22] Filed: Jan. 21, 1980

[51] Int. Cl.$^3$ .................. C08G 63/44; C08G 69/44
[52] U.S. Cl. .................. 528/288; 156/332; 428/480; 528/302; 528/309
[58] Field of Search .................. 528/288, 302, 309; 156/332; 428/480

[56] References Cited

U.S. PATENT DOCUMENTS

| | | | |
|---|---|---|---|
| 2,925,405 | 2/1960 | Laakso et al. | 528/288 X |
| 3,948,859 | 4/1976 | Sublett et al. | 528/304 |
| 4,081,428 | 3/1978 | Thompson | 528/288 X |
| 4,094,721 | 6/1978 | Sturm et al. | 156/306.6 |

*Primary Examiner*—Lucille M. Phynes
*Attorney, Agent, or Firm*—John F. Stevens; Daniel B. Reece, III

[57] ABSTRACT

Disclosed is a hot-melt adhesive composition comprising a polyester amide of from about 50 to about 85 mole % terephthalic acid, from about 15 to about 50 mole % of an aliphatic dicarboxylic acid having from 4 to 12 carbon atoms, about 60 to about 90 mole % of 1,6-hexanediol, and from about 10 to about 40 mole % 1,6-hexanediamine. The polyester amide has a glass transition temperature of from about $-15°$ to about $15°$ C., a melting point of about 70° to about 140° C., and is useful as a fabric adhesive.

9 Claims, No Drawings

POLYESTER AMIDE FABRIC ADHESIVES

BACKGROUND OF THE INVENTION

1. Field of the Invention

This invention relates to new polyester amide compositions having utility as fabric adhesives. More particularly, it relates to novel polyester amides derived from terephthalic acid, 1,6-hexanediol, 1,6-hexanediamine and dicarboxylic acids having 4 to 12 carbon atoms.

2. Description of the Prior Art

Patents relating to the use of synthetic polyesters for use as fabric adhesives include U.S. Pat. Nos. 4,094,721 and 3,948,859. These patents generally suggest that for a composition to function as a fabric adhesive, it should have a relatively low melting point and a relatively rapid rate of crystallization. The final bond should also be sufficiently crystalline that it is not softened by dry cleaning solvents.

It has now been found that polyester amide compositions having a suitable level of melting point, adhesive bond strength, solvent resistance, and set-up time can be produced. It is well known that polyesters can be used as fabric adhesives by proper modification of the base polymer compositions to meet the melting point requirements for the specific adhesive applications involved. However, the range of modifications permissible will vary depending on the base polyester selected and on the end-use application. We have found that by using polyester amides rather than polyesters, we gain an unexpected increase in resistance to organic solvents of the type used in dry cleaning processes such as perchloroethylene. This resistance to organic solvents is unexpected because the resulting compositions have an additional component and it would be expected to be a less crystalline material due to the introduction of such component in the polymer. Solubility of polymers in solvents is dependent to some extent on the crystallinity of the polymer. It is surprising that the polymers of our invention are not attacked by the solvents in question. By increased resistance, we mean that either the bonds have a higher bond strength than the corresponding polyester bonds or that the bonds prepared from the specific polyester amide composition resist the attack of solvents for a longer period of time than the unmodified polyester composition. The polyester amides are also more effective over a wider range of substrates than are the polyester adhesives.

Although we are not certain of the exact reason for this latter phenomenon, we believe that the possibilities for hydrogen bonding which exist in the polyester amide compositions are an important factor. Thus, the hydrogen atoms attached to the nitrogen atoms in the polyester amide chain can become attached via hydrogen bonds to sites in the substrate. The resulting bonds are then stronger and more solvent resistant than mere mechanical bonds in which chemical attractive forces are not involved.

SUMMARY OF THE INVENTION

The present invention provides a hot-melt adhesive composition comprising a polyesteramide of from about 50 to about 85 mole % terephthalic acid, from about 15 to about 50 mole % of at least one aliphatic dicarboxylic acid having from 4 to 12 carbon atoms, about 60 to about 90 mole % of 1,6-hexanediol, and from about 10 to about 40 mole % 1,6-hexanediamine. The polyesteramide has a glass transition temperature of from about $-15°$ to about $15°$ C., and a melting point of about $70°$ to about $140°$ C. It is especially useful as a fabric adhesive because of its low melting point, adhesive bond strength, solvent resistance and short set-up time.

DETAILED DESCRIPTION OF THE INVENTION

According to the present invention, polyester amides especially useful as fabric adhesives are provided. These polyester amides have melting points in the range of from about $70°$ to about $140°$ C., preferably from about $90°$ to about $110°$ C. and are derived by copolymerizing (I) from about 50 to about 85 mole % terephthalic acid; (II) from about 50 to about 15 mole % of at least one aliphatic dicarboxylic acid having from 4 to 12 carbon atoms; (III) from about 60 to about 90 mole % of 1,6-hexanediol; and (IV) from about 40 to about 10 mole % of 1,6-hexanediamine. The mole percents are based on 100 mole % acid and 100 mole % for the sum of the 1,6-hexanediol and 1,6-hexanediamine. The glass transition temperature (Tg) of the compositions according to this invention are in the range of from about $-15°$ to $+15°$ C.

Terephthalic acid, or esters thereof, are well known, commercially available products. Aliphatic dicarboxylic acids having 4 to 12 carbon atoms such as, for example, succinic, glutaric, adipic, 1,4-cyclohexanedicarboxylic, suberic, azelaic, sebacic, dodecanedicarboxylic are also commercially available products. 1,6-Hexanediol and 1,6-hexanediamine are commercially available products.

It should be understood that rather than use of the named compounds themselves, it may sometimes be convenient to use esters of terephthalic acid such as dimethyl terephthalate, or dimethyl adipate, or salts of 1,6-hexanediamine.

The preferred composition of this invention have melting points in the $90°-110°$ C. range and are obtained when the amount of terephthalic moiety in the composition is in the 60–70 mole percent range, the amount of 4 to 12 carbon aliphatic dicarboxylic acid is in the 30–40 mole % range, the amount of 1,6-hexanediol is in the 80–90 mole % range, and the amount of 1,6-hexanediamine is in the 10–20 mole % range. A preferred composition of this invention is that in which the aliphatic dicarboxylic acid is adipic acid.

The compositions of this invention can be prepared using synthesis techniques generally used for the preparation of polyester compositions. In one such preparation, dimethyl terephthalate, dimethyl adipate, excess 1,6-hexanediol, and a stoichiometric amount of the salt prepared from 1,6-hexanediamine and adipic acid are charged to a reaction flask along with a catalyst such as tetraisopropyl titanate and heated through an ester interchange period and then through a vacuum buildup period at $240°$ C. to give the final polymer. In the synthesis, the diesters may be replaced with the diacids, and the diamine salt may be replaced with the free diamine. Other catalysts may be used such as acetyl triisopropyl titanate, dibutyltin diacetate, and the like. Generally speaking, the first phase of the reaction is carried out at temperatures in the $200°-230°$ C. range and the vacuum stage polycondensation phase is run at $240°$ C. or higher. The temperature is kept as low as possible in order to avoid formation of colored products and to avoid formation of odoriferous by-products.

Although not required in the practice of this invention, small amounts of stabilizers, pigments, colorants, anticaking agents, fluorescent agents or other additives normally used in fusible interlining applications may be used if desired.

These compositions are readily put into powder form using conventional grinding techniques. The powders are nonblocking and can be readily applied to fusible interlining fabrics from powder point applicators, from random sprinkling equipment, or in the form of a paste. The particles are finely divided, i.e., from about 1 micron to about 500 microns. For example, in the application of powders from powder point applicators, it is desirable to have powders with a particle size range of 50–200 microns (270–70 mesh). For random sprinkling application on tightly woven or nonwoven fabrics, particle size of 150–300 microns (100–50 mesh) is desirable. For random sprinkling on open-weave fabrics such as inexpensive rayon/cotton blends, powders with 300–500 micron size (50–35 mesh) are required. For application of powder in paste form, it is necessary to have very fine powders. For example, in paste form, powder size should be 1–80 micron (less than 200 U.S. mesh).

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

For purposes herein, the term "melting point" means that temperature at which the solid and liquid phases of the material are at equilibrium at atmospheric pressure.

The "heat of fusion", $H_f$ of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

As indicated above, when copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

The following examples are submitted for a better understanding of the invention.

EXAMPLE 1—Preparation of Polyester Amide of Poly(hexamethylene terephthalate) Modified With 10 Mole % 1,6-Hexanediamine and 35 Mole % Adipic Acid The following materials are placed in a 500-ml single-neck flask: 100.9 g (0.52 m) of dimethyl terephthalate, 40.9 g (0.28 m) of adipic acid, 127.4 g (1.08 m) of 1,6-hexanediol, 9.8 g (0.8 m) 1,6-hexanediamine, and sufficient dibutyltin diacetate catalyst solution to give 236 ppm tin in the final product. The reaction flask is fitted with a stirrer and a nitrogen sweep gas is passed through the apparatus to provide an inert atmosphere. The reaction mixture is heated and stirred one hour at 200° C., the temperature is raised to 230° C., and after two hours, the temperature is raised to 260° C. The system is then placed under vacuum and heated at 260° C. for one hour and 45 minutes. The reaction flask is then cooled and the I.V. of the product is 0.76. The DSC melting point of the product is 108° C., the Tg is −6° C., and the heat of fusion is 5.16 cal/gm.

This polymer is ground to pass a 70-mesh screen in conventional cryogenic grinding equipment. The bond strength on polyester double-knit fabric is obtained by applying the powder to the fabric using a conventional powder point applicator at a nominal coating weight of 16 g/yd$^2$ of fabric. The bond is formed by making a lap joint with an uncoated fabric on a garment press for 15 seconds at 110° C. The T-peel initial bond strength is 2.2 pli when tested at a crosshead separation rate of 12 inches/minute at 23° C. The result quoted is an average of three tests. The average bond strength after 20 cycles in a commercial dry cleaning establishment is 2.1 pli, and inspection of the bonded area shows that the bond is still intact, i.e., delamination is not occurring.

When a polyester-wool blend is used rather than a polyester double-knit fabric as in the above example, the initial T-peel bond strength is 3.0 pli and after 20 cleaning cycles in a commercial dry cleaning establishment, the bond strength is 1.2 pli.

EXAMPLE 2

The procedure of Example 1 is repeated with the exception that the reaction mixture is adjusted to provide a poly(hexamethylene terephthalate) modified with 40 mole % adipic acid and 20 mole % of 1,6-hexanediamine. The polymer I.V. is 0.66, the melting point is 101° C., and the Tg is −3° C.

When a bond is prepared as described in the previous example, the initial bond strength is 1.3 pli, and after 20 cycles in a commercial dry cleaning process, the bond strength is 1.0 pli, and delamination is not occurring.

When the fabric being bonded is a polyester-wool blend fabric, the initial bond strength is 3.2 pli. After 20 cycles through a commercial dry cleaning process, the bond strength is 1.7 pli and no delamination is occurring.

EXAMPLE 3

The procedure of Example 1 is repeated with the exception that the reaction charge is adjusted to provide a poly(hexamethylene terephthalate) modified with 50 mole % of adipic acid and 40 mole % of 1,6-hexanediamine. The polymer I.V. is 0.62, the melting point is about 111° C., and the Tg is about 12° C.

When a bond is prepared from the composition of this example using the procedure of Example 1 and tested as described therein, the bond shows excellent bond strength retention on both polyester double-knit and polyester-wool blends during the dry cleaning test and delamination is not occurring.

EXAMPLE 4

The procedure of Example 1 is repeated with the exception that the reaction ratios are adjusted to provide a poly(hexamethylene terephthalate) modified with 15 mole % of adipic acid and 15 mole % of 1,6-hexanediamine. The polymer I.V. is 0.73, the melting point is about 128° C., and the Tg is about 8° C.

Bonds prepared from this composition using the procedure of Example 1 with a higher temperature setting for the press show excellent bond strength retention during the dry cleaning test without delamination.

EXAMPLE 5

The polymer used in this experiment is a modified polyester and is not a composition of our invention. The polymer is poly(hexamethylene terephthalate) modified with 30 mole % of adipic acid, and the polymer I.V. is 0.8. Bonds prepared from the composition using the procedure in Example 1 on polyester double-knit fabric have an initial bond strength of 0.6 pli and the bonds delaminate during 20 cycles in a commercial dry cleaning process.

EXAMPLE 6

Preparation of Polyester Amide of Poly(hexamethylene terephthalate) Modified With 10 Mole % 1,6-Hexanediamine and 35 Mole % Glutaric Acid The procedure of Example 1 is repeated with the exception that adipic acid is replaced with an equivalent molar amount of glutaric acid and the vacuum buildup temperature is reduced to 240° C. The final I.V. of the polymer is 0.72.

When a bond is prepared from the composition of this example using the procedure of Example 1 and tested as described therein, the bond shows excellent bond strength retention on both polyester double-knit and polyester-wool blends during the dry cleaning test and delamination is not occurring.

EXAMPLE 7

Preparation of Polyester Amide of Poly(hexamethylene terephthalate) Modified With 10 Mole % 1,6-Hexanediamine and 35 Mole % Sebacic Acid The procedure of Example 1 is repeated with the exception that adipic acid is replaced with an equivalent molar amount of sebacic acid and the vacuum buildup temperature is 240° C. The final I.V. of the polymer is 0.62.

When a bond is prepared from the composition of this example using the procedure of Example 1 and tested as described therein, the bond shows good bond strength retention on both polyester double-knit and on polyester-wool blends during the dry cleaning test and delamination is not occurring.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

We claim:

1. A hot-melt adhesive composition comprising a polyester amide of from about 50 to about 85 mole % terephthalic acid, from about 15 to about 50 mole % of an aliphatic dicarboxylic acid having from 4 to 12 carbon atoms, about 60 to about 90 mole % of 1,6-hexanediol and from about 10 to about 40 mole % 1,6-hexanediamine, said polyesteramide having a glass transition temperature of from about −15° to about 15° C., and a melting point of about 70° to about 140° C.

2. A hot-melt adhesive composition according to claim 1 wherein said aliphatic dicarboxylic acid is adipic acid.

3. A hot-melt adhesive composition comprising a polyesteramide of from about 60 to about 70 mole % terephthalic acid, from about 40 to about 30 mole % of an aliphatic dicarboxylic acid having from 4 to 12 carbon atoms, about 80 to about 90 mole % of 1,6-hexanediol and from about 20 to about 10 mole % 1,6-hexanediamine, said polyester amide having a glass transition temperature of from about −15° to about 15° C., and a melting point of about 70° to about 140° C.

4. A hot-melt adhesive composition according to claim 3 having a melting point between about 90° and 110° C.

5. A hot-melt adhesive composition according to claim 3 wherein said aliphatic dicarboxylic acid is adipic acid.

6. The composition of claim 1 in powder form having an average particle size between 1 and 500 microns.

7. The composition of claim 3 in powder form having an average particle size between 1 and 500 microns.

8. Substrate material adhesively connected by means of the hot-melt adhesive composition of claim 1.

9. Fabric material adhesively connected by means of the hot-melt adhesive composition of claim 1.

* * * * *